(12) United States Patent
Hayashi

(10) Patent No.: US 6,359,356 B1
(45) Date of Patent: Mar. 19, 2002

(54) CONTROLLER FOR MAGNETIC BEARING

(75) Inventor: Yasukazu Hayashi, Niwa-gun (JP)

(73) Assignee: Okuma Corporation, Nagoya (JP)

( * ) Notice: Subject to any disclaimer, the term of this patent is extended or adjusted under 35 U.S.C. 154(b) by 0 days.

(21) Appl. No.: 09/612,306

(22) Filed: Jul. 7, 2000

(30) Foreign Application Priority Data

Jul. 15, 1999 (JP) .......................................... 11-202267

(51) Int. Cl.$^7$ ................................................. H02K 7/07
(52) U.S. Cl. ..................................................... 310/90.5
(58) Field of Search ............................... 310/90.5, 68 B, 310/166; 318/716, 717, 721, 798, 799

(56) References Cited

U.S. PATENT DOCUMENTS

| | | | | |
|---|---|---|---|---|
| 5,880,549 A | * | 3/1999 | Chiba et al. ................. | 310/168 |
| 6,020,665 A | * | 2/2000 | Maurio et al. .............. | 310/90.5 |
| 6,034,456 A | * | 3/2000 | Osama et al. ............... | 310/90.5 |
| 6,078,119 A | * | 6/2000 | Satoh et al. ................. | 310/90.5 |
| 6,130,494 A | * | 10/2000 | Schob ........................ | 310/90.5 |

* cited by examiner

*Primary Examiner*—Nestor Ramirez
*Assistant Examiner*—Dang Dinh Le
(74) *Attorney, Agent, or Firm*—Oliff & Berridge, PLC

(57) ABSTRACT

The present invention relates to a magnetic bearing controller, capable of reducing the number of power transistors to control current as well as associated costs. Thrust commands FX, FY in X and Y directions, which are output from force control circuits to be added to a rotor, are subjected to pole coordinate conversion in a pole coordinate converter, into "F" indicative of a force magnitude and "A" indicative of a force direction angle. Then, a three-phase current value converter converts F and A into current values Cu, Cv, Cw for three-phase currents, and a three-phase current control circuit controls currents Iu, Iv, Iw, to be supplied to the three-phase windings, respectively, so as to match the currents with the current values Cu, Cv, Cw for the three-phase currents supplied from the three-phase current value converter, and excites three pole teeth of a stator, thereby compensating for a displacement of an axis of the rotor.

2 Claims, 2 Drawing Sheets

CONTROLLER FOR MAGNETIC BEARING

BACKGROUND OF THE INVENTION

1. Field of the Invention:

The present invention relates to a magnetic bearing controller for compensating for displacement of a rotor axis in a non-contact manner utilizing magnetic force, and in particular to improved control of an amount of current to be supplied to windings.

2. Description of the Related Art:

FIG. 2 is a perspective view showing a general structure of a magnetic bearing. A rotation motor 3 causes the axis 1 to rotate at a high speed. A magnetic bearing 4 for a thrust direction holds the axis 1 for a constant position in the thrust direction. Magnetic bearings 2, 5 for a radial direction hold the axis 1 in a constant position in the radial direction.

FIG. 3 is a block diagram showing a structure of a conventional magnetic bearing controller for holding the axis in a constant position in the radial direction. In the drawing, the radial magnetic bearing is shown cross sectionally, viewed in the thrust direction. The rotor 6 is a cylinder formed by laminating ring-shaped silicon steel sheets in the thrust direction, and fixed to the axis 1 by shrinking insert process. The stator 7 is formed by laminating silicon steel sheets in the thrust direction, in which eight pole teeth are arranged equidistantly along the inner circumference thereof. As two adjacent teeth make one pair, there are four pairs in the configuration of this embodiment. Each pair is wound by a winding 11, 12, 13, 14, forming four electromagnets. Here, when current is supplied to any winding, an excited electromagnet generates a magnetic attraction force, which in turn causes the rotor 6 to move in the direction of the excited electromagnet.

Position detectors 8, 9 detect the position of the rotor 6 in the X- and Y-axis directions, respectively, in a vertical coordinate system, and output position signals SX, SY. Subtractors 15, 16 subtract the respective position signals SX and SY from target position signals GX, GY for the X and Y directions in the rotor 6, and output corresponding subtraction signals DX, DY. Subtraction signals DX, DY are input into respective force control circuits 17, 18, respectively, which in turn output force command values FX, FY in the X and Y directions, respectively. The force command values FX, FY to be given to the rotor 6 are output so that subtraction signals become zero. Current value converters 19, 20 carry out appropriate processing, such as a square root operation or a bias thrust addition, with respect to the force command values FX, FY such that the force command values FX, FY have linear correspondence with current to be supplied to the windings, to thereby convert the force command values FX, FY into current value signals CPX, CNX, and CPY, CNY, indicative of the value of a current to be supplied to the windings 11, 13 and 12, 14, respectively. Current control circuits 21, 22 perform pulse width modulation to drive a number of incorporating power transistors to respectively control currents IPX, INX and IPY, INY to be supplied to the windings 11, 13 and 12, 14 so as to match the currents with the current value signals CPX, CNY and CPY, CNY.

In operation, the magnetic bearing controller shown in FIG. 3 can control the rotor 6 such that the positions thereof in the two directions in the vertical coordinate system will follow the target position signals GX and GY, respectively. When the target position signals GX and GY are held constant, the magnetic bearing can function as a radial bearing for restraining the position of the rotor 6 in the radial direction.

However, a conventional radial magnetic bearing has a problem of increased cost as a magnetic bearing controller requires a number of expensive power transistors to control eight independent phases of currents to be supplied to the four electromagnets.

Further, because each of the eight pole teeth must be wound by a winding, manufacturing steps are resultantly complicated and costs are further increased.

Still further, because, except for magnetic bearings, there exists almost no device requiring control of eight-phase currents flowing in four windings, and a magnetic bearing is almost exclusively used in a specific spindle for a vacuum pump or a machining tool, and so on, for high speed rotation, scale merit of cost reduction can be hardly expected. Thus, very expensive current controllers are resulted. Therefore, a magnetic bearing system, despite its superior performance as a bearing for high speed rotation, suffers from a problem of high costs, compared to a general bearing system utilizing a rolling bearing.

SUMMARY OF THE INVENTION

The present invention has been conceived to overcome the above problems and aims to provide a simple-structured controller of a magnetic bearing, for realizing cost reduction and a function equivalent to that which would be obtained through eight-phase controlling.

In order to achieve the above object, according to a first aspect of the present invention, there is provided a magnetic bearing controller. The controller is attached to a magnetic bearing which comprises a stator made of magnetic material having a plurality of pole teeth arranged with an interval space, along an external circumference of a rotor made of magnetic material, three windings connected in star connection or delta connection for exciting the plurality of pole teeth, and an axis displacement sensor for detecting a position displacement of the rotor in two orthogonal directions, and controls current to be supplied to the three windings. The controller comprises a three-phase current value conversion means for computing, in response to receipt of a signal indicative of an axial position displacement in two orthogonal directions, three current values for the three windings, to cause the three windings to generate a magnetic force to serve as a thrust for compensation of the axial displacement position of the rotor.

Also, preferably, the three-phase current value conversion means computes the three current values Iu, Iv, Iw based on the expressions $$Iu = F * COS(\theta)$$

$$IV = F * COS(\theta + 2\pi/3)$$

$$Iw = F * COS(\theta + 4\pi/3)$$

wherein F is a value proportional to a squared value of a force magnitude, A is a directional angle of the force, n is a desirably selected integer, and $\theta$ is $A/2 + n\pi$.

Further, preferably, the three-phase current conversion means determines a value for the n such that division, by $\pi$, of an absolute value of a difference between $\theta$, computed based on a last input axial position displacement, and $\theta$, computed based on currently input axial position displacement, leaves a smallest surplus.

BRIEF DESCRIPTION OF THE DRAWINGS

The above and other objects, features, and advantages of the present invention will become further apparent from the following description of the preferred embodiment taken in conjunction with the accompanying drawings wherein.

DESCRIPTION OF THE PREFERRED EMBODIMENTS

In the following, a magnetic bearing controller of a preferred embodiment of the present invention will be described with reference to the accompanying drawings.

A magnetic bearing controller according to the present invention is equipped to a magnetic bearing which has windings, connected in star or delta connection, for causing three pole teeth to generate magnetic fluxes, and controls three-phase currents for controlling movement of the axis in the radial direction to thereby compensate for a displacement of axis. With the above configuration, a magnetic bearing controller according to the present invention can ensure such performance equivalent to that which would be attained through control using eight phase currents, while reducing the number of current phases.

Figure 1:
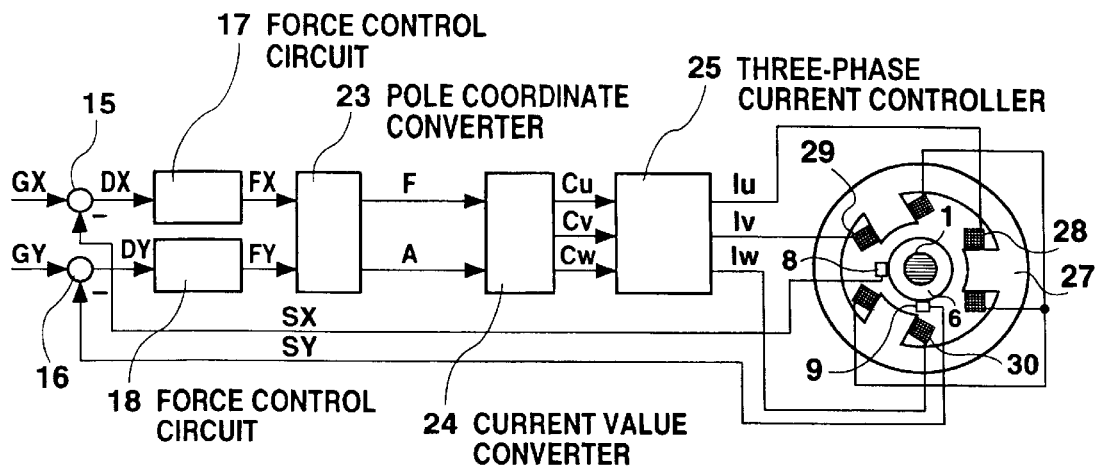
FIG. 1 is a block diagram showing a structure of a magnetic bearing controller in a preferred embodiment of the present invention.
Figure 2:
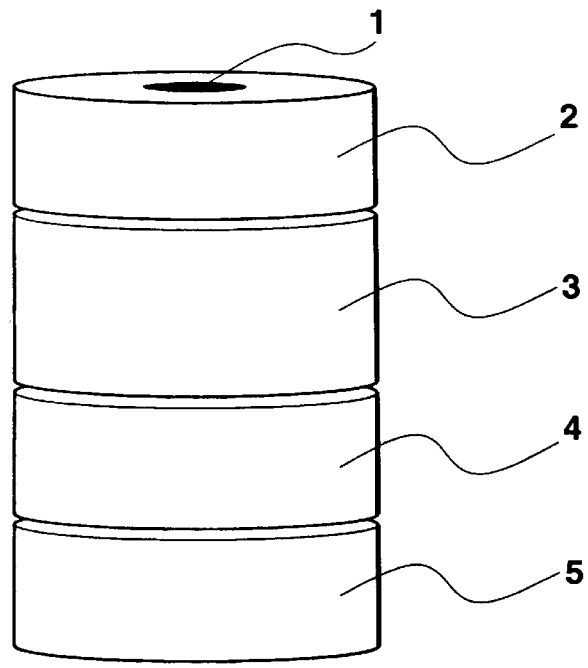
FIG. 2 is a perspective view showing a general structure of a magnetic bearing.
Figure 3:
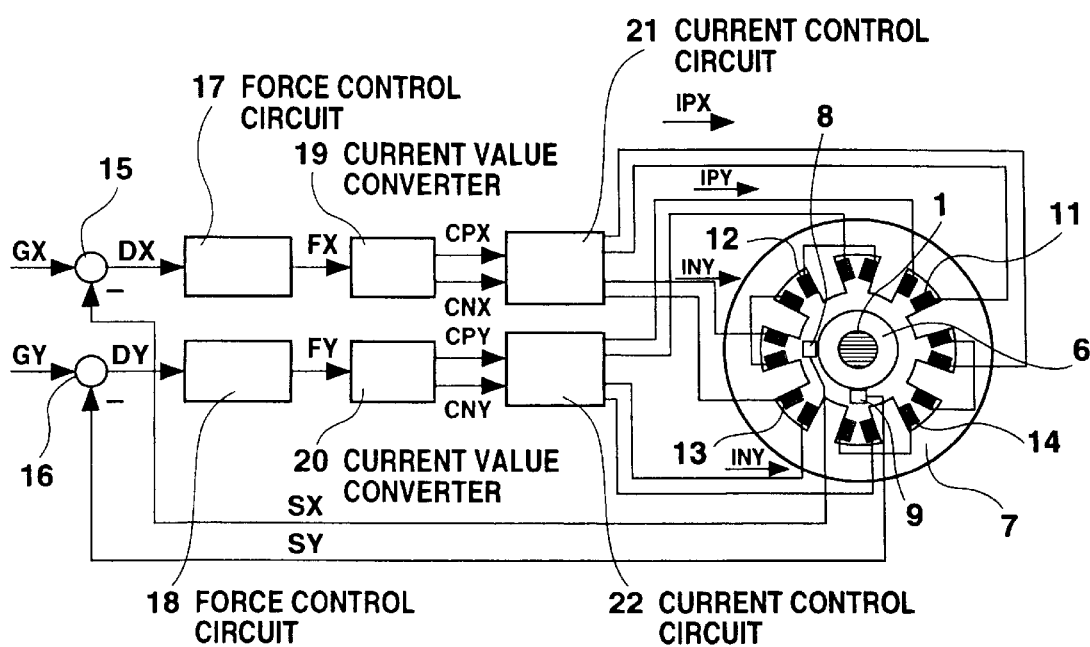
FIG. 3 is a block diagram showing a structure of a conventional magnetic bearing controller.

FIG. 1 is a block diagram showing a structure of magnetic bearing controller according to the present invention, in which a magnetic bearing is shown as cross sectional viewed in the thrust direction. Note that members identical to conventional ones are given identical numerical references as those in FIG. 3, and detailed explanations thereof are not repeated here.

A stator 27 is formed by laminating magnetic materials, such as silicon steel sheets, in the thrust direction, and three pole teeth are arranged equidistantly along the inner circumference of the stator 27. Three teeth of the stator 27 are respectively wound by windings 28, 29, 30, which are connected to one another in star connection. Force commands FX, FX in the X and Y directions, supplied from the thrust controller 17, 18 for addition to the rotor 6, are converted into pole coordinates (F, A) based on the expression 1 below in the pole coordinate converter 23.

$$F=C*SQRT(FX^2+FY^2) \quad A=ATAN2(FX,FY) \quad (1)$$

wherein C is a constant coefficient, SQRT is a square root operation function, ATAN2 is an inverted tangent operation function using two variable inputs and also a function for computing an inclination angle, relative to a predetermined axis, of a vector having FX and FY components. The pole coordinate converter 23 outputs F indicative of a force magnitude and A expressing, in the form of an angle, a thrust direction, to a three-phase current value converter 24 which acts as a three-phase current value conversion means. The three-phase current value converter 24 obtains a current amount I and a phase θ based on the following expression 2.

$$I=SQRT(F) \quad \theta=A/2+\pi n \quad (2)$$

wherein "n" is either 0 or 1. The three-phase current value converter 24 selects either 0 or 1 for "n" for the calculation of expression 2. Specifically, the three-phase current converter 24 holds θ obtained in previous operation as θp, and calculates θ0−θp and θ1−θp, using θ0 as θ for n=0 and θ1 for n=1, to select as a phase θ, one of θ0 and θ1 which leaves the smaller surplus when dividing absolute values of θ0−θp and θ1−θp by π, respectively.

Further, the three-phase current value converter 24 determines current values Cu, Cv, Cw of three-phase, based on the following expression 3.

$$Cu=I*COS(\theta)$$

$$Cv=I*COS(\theta+2\pi/3)$$

$$Cw=I*COS(\theta+4\pi/3) \quad (3)$$

Upon receipt of the current values Cu, Cv, Cw for the three-phase currents from the three-phase current value converter 24, the three-phase current controller 25 controls corresponding currents Iu, Iv, Iw so as to be equivalent to these values, and then supplies them to the corresponding windings 28, 29, 30.

Next, operation of a magnetic bearing under the above current control will be described.

With currents Iu, Iv, Iw flowing through the windings 28, 29, 30, magnetic fluxes, substantially proportional to the current amount, are caused from the three pole teeth. Here, when the spaces between the rotor and the three pole teeth are uniform, magnetic attraction forces, or Fu, Fv, Fw, which are applied to the rotor 6 by the magnetic fluxes generated by the pole teeth, are expressed as follows based on the fact that a magnetic attraction force is proportional to a squared magnetic flux density.

$$Fu=K*I^2 Fv=K*Iv^2 Fw=K*Iw^2 \quad (4)$$

wherein K is a proportional coefficient depending on the relationship between a force of a magnetic bearing and a current. When the center of the rotor 6 is set as the origin, and the direction of the pole tooth wound by the winding 28 is set as X axis, and 0 degree, X and Y components, or Fx, Fy, of the force applied to the rotor 6, are expressed respectively as expression 5.

$$Fx = Fu - \{COS(\pi/3)\}(Fv + Fw) \quad (5)$$
$$= K(Iu^2 - (Iv^2 + Iw^2)/2)$$
$$Fy = \{SIN(\pi/3)\}(Fv - Fw)$$
$$= \sqrt{3K(Iv^2 - Iw^2)/2)}$$

Therefore, the above can be rewritten as follows according to expression 3.

$$Fx=(3/4)K*I^2*COS(2\theta) \quad Fy=(3/4)K*I^2*SIN(2\theta) \quad (6)$$

The above can be further rewritten as follows according to expression 2.

$$Fx=(3/4)K*F*COS(A+2\pi n)=(3/4)K*F*COS(A) \quad Fy=(3/4)K*F*SIN(A+2\pi n)=(3/4)K*F*SIN(A) \quad (7)$$

Through modification of expression 1, the below is obtained.

$$COS(A)=FX/(F/C) \quad SIN(A)=FY/(F/C) \quad (8)$$

With (3/4)K=1/C, substitution of expression 7 by expression 8 leads to expression 9.

$$Fx=FX \quad Fy=FY \quad (9)$$

Thus, use of a pole coordinate converter 23, a three-phase current value converter 24, and a three-phase current controller 25 enables compensating for the displacement of axis by controlling a magnetic bearing having star-connected three windings as shown in FIG. 1, in a manner similar to that performed by a conventional magnetic bearing controller using eight phase currents.

Here, in the above selection of either 0 or 1, or an even or odd number, for "n" by the three-phase current value converter 24, the selection is made such that a smaller surplus is left when dividing, by π, an absolute value of a difference between phase θ and phase θp, obtained in a previous operation. This is for prevention of an abrupt change in a current flowing in the three-phase windings. That is, as can be appreciated from expression 3, although the direction of a current to be supplied to a winding when θ is A/2 is opposite that when θ is A/2+π, the force applied to the rotor 6 is the same, as can be understood from expression 6. Utilizing this fact, when that control is applied with θ being A/2, when θ is changed from an angle slightly smaller than +π to an angle slightly larger than −π, current to be supplied to the winding in the conventional manner must be abruptly changed in order to change θ from π/2 to a value close to −π/2. However, selection of "n" as described above enables prevention of an abrupt change of a current to be applied to the three-phase windings, while applying a likewise large force to the rotor 6, by changing θ from an angle slightly smaller than π/2 to that slightly larger than π/2.

Note that, although in the above example, the three windings are connected in a start pattern, a delta pattern may be employed instead. Also, although current to be supplied to the windings is expressed using a COS function in expression 3, when premise conditions, such as a reference direction to serve as an X axis, are changed, a constant offset phase may be added to the respective three-phases, and/or a SIN function may be used instead.

According to a magnetic bearing controller of the present invention, displacement of rotor axis can be compensated for without using eight-phase current control. Thus, the number of phases for current control, the number of power transistors, and costs, can all be reduced.

In addition, because three-phase current control circuits are produced in mass production for use in three-phase motor control, use of such circuits enables significant cost reduction of a current magnetic bearing controller. Moreover, because the number of spots to wind by a winding is significantly reduced, specifically, from eight to three, such circuits can be more easily manufactured and associated manufacturing costs are reduced.

What is claimed is:

1. A magnetic bearing controller for attachment to a magnetic bearing which comprises a stator made of magnetic material having a plurality of pole teeth arranged with an interval space along an external circumference of a rotor made of magnetic material, three windings connected in star connection or delta connection for exciting the plurality of pole teeth, and an axis displacement sensor for detecting a position displacement of the rotor in two orthogonal directions, and control currents to be supplied to the three windings, the controller comprising:

three-phase current value conversion means for computing, in response to receipt of a signal indicative of an axial position displacement in two orthogonal directions, three current values for the three windings to cause the three windings to generate a magnetic force to compensate for the axial position displacement of the rotor, wherein the three-phase current value conversion means computes the three current values Iu, Iv, Iw based on expressions $Iu=F*COS(\theta)$ $Iv=F*COS(\theta+2\pi/3)$ $Iw=F*COS(\theta+4\pi/3)$ wherein F is a value proportional to a squared value of a force magnitude, A is a directional angle of the force, n is a desirably selected integer, and θ is A/2+nπ.

2. A controller according to claim 1, wherein the three-phase current conversion means determines a value for the n such that division, by π, of an absolute value of a difference between θ, computed based on a last input axial position displacement, and θ, computed based on currently input axial position displacement leaves a smallest surplus.

* * * * *